(12) United States Patent  (10) Patent No.: US 7,471,243 B2
Roslak  (45) Date of Patent: Dec. 30, 2008

(54) LOCATION DETERMINATION UTILIZING ENVIRONMENTAL FACTORS

(75) Inventor: Thomas K. Roslak, Eastport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 52 days.

(21) Appl. No.: 11/377,749

(22) Filed: Mar. 16, 2006

(65) Prior Publication Data

US 2006/0232472 A1  Oct. 19, 2006

Related U.S. Application Data

(60) Provisional application No. 60/666,338, filed on Mar. 30, 2005.

(51) Int. Cl.
*G01S 3/02* (2006.01)
*G01S 3/80* (2006.01)

(52) U.S. Cl. .................. 342/463; 342/464; 367/118

(58) Field of Classification Search ......... 342/463–465; 367/118
See application file for complete search history.

(56) References Cited

U.S. PATENT DOCUMENTS 6,799,047 B1   9/2004   Bahl et al.

2002/0145565 A1*  10/2002  Rabinowitz et al. ......... 342/464
2004/0061646 A1*   4/2004  Andrews et al. ............ 342/463
2005/0285790 A1*  12/2005  Gagnon ...................... 342/464

OTHER PUBLICATIONS

E.A. Geiger, Worldwide multistandard TV-sets in lieu of a world TV-standard, IEEE Transactions of Consumer Electronics, vol. 43(3), p. xv-xviii, Aug. 1988.*

* cited by examiner

*Primary Examiner*—Thomas H. Tarcza
*Assistant Examiner*—Fred H. Mull
(74) *Attorney, Agent, or Firm*—Fay Kaplun & Marcin, LLP (57) ABSTRACT

A method and apparatus for determining the geographic location of a user incorporates the sensing of a plurality of physical environmental parameters at the user's location. The parameter values are compared to corresponding parameter values associated with known locations, and a best-fit correlation is established. The identity of the determined location may be displayed to the user, or may be used to control a location-based operation, such as the unlocking of a safe, the transmission of an entry password, or the disabling of a piece of equipment. Persistence weighting values for different environmental parameters may be applied to improve the reliability of the correlation.

21 Claims, 6 Drawing Sheets

| SSID | SNR | Signal | Channel | Encryption | MAC | IP Addr. | Rate | Vendor |
|------|-----|--------|---------|------------|--------------|----------------|------|--------|
| Tom   | 14 | 7  | 1  | Open | 0080C837D7F7 | 192.168.1.1    | 11  | XYZ |
| Deli  | 10 | 6  | 6  | WEP  | 020430FD26A  | 24.187.75.253  | 5.5 | ABC |
| Hotel | 21 | 14 | 1  | Open | 000FF7D01A15 | 68.142.226.11  | 11  | QRS |
| Hotel | 8  | 5  | 6  | Open | 000FF7D01E10 | 68.142.226.12  | 5.5 | QRS |
| Hotel | 5  | 3  | 11 | Open | 000FF7D01E30 | 68.142.226.13  | 2   | ABC |

LOCATION DETERMINATION UTILIZING ENVIRONMENTAL FACTORS

The present application claims the priority of U.S. Provisional application Ser. No. 60/666,338, filed Mar. 30, 2005.

FIELD OF INVENTION

This invention relates generally to an improved system and method for improved location prediction, incorporating the capture and entry into a mobile device of data derived from environmental factors, which data are extrapolated to predict the location of the device, and more specifically to a device and method to enable a mobile device, such a mobile hand held device, to derive or obtain a predicted location based upon measurable environmental parameters that the device detects. Such parameters may be derived from sources of electromagnetic radiation that are not specifically associated with an element of the position location system, such as noise sources, non-licensed or affiliated equipment, and identifiable radiation sources.

BACKGROUND OF THE INVENTION

The accurate determination of the location of an object is of immense value. The Global Positioning System (GPS) maintained by the U.S. government allows accurate location determination based upon the simultaneous receipt of broadcast data signals from GPS satellites and the calculation of positional information based upon differences in arrival times of simultaneously-broadcast signals. While GPS position data is highly accurate, it requires reception of multiple satellite transmissions. These transmissions may not be accessible at al times and at all locations, and particularly in urban areas and indoors.

U.S. Pat. No. 6,799,047 to Bahl, et al, "Locating and Tracking a User in a Wireless Network through Environmentally Profiled Data" describes an alternate system that determines a location of a user receiver, and particularly within a building, by measuring the signal strength of fixed base stations of a wireless local area network in the building or comparable known physical environment. The signal strengths are measured and compared to a tabulation of signal strengths and locations. Thus use of the system is limited to the range of the particular set of base stations and the generally limited range of their broadcasts. Bahl does not address wide ranging field situations where a mobile device, such as a mobile phone or wireless enabled hand held device, is beyond the known base stations' environment.

It is accordingly a purpose of the present invention to provide a method and apparatus by which a mobile device is not limited by the particular operating range of a particular base station system for position determination. The present invention comprises a preferably mobile device to sense a variety of environmental parameters, such as radio signals, interference and signal parameters of a broad spectrum of other signal sources that may exist in the local environment. Unlike devices in the prior art, the present invention can utilize all available data that can be sensed by the receiver apparatus, thus allowing the local environment to be characterized for future reference for comparison purposes, but with a recognition that the environment is not static but subject to dynamic reconfiguration and alteration as a result of local conditions.

BRIEF SUMMARY OF THE INVENTION

The present invention contemplates the collection of data by a receiver separately and independently of its conventional radio connectivity. A user of a portable device may stop to do a specific activity, for example, delivering a package or servicing a machine, without establishing radio connectivity. With the device activated at a chosen location, for example while servicing a refrigeration unit at a building site, sensors of the device will measure and store whatever receivable environmental data is available. This data is compared to a database of comparable data, indexed to locations for location determination or, if the location is known, indexed to the location for inclusion in the database for subsequent correlation use. The correlated data and location may be stored locally on the device and transferred to a remote database at a later time, or may be immediately and directly transferred to the database through wireless communications.

The database of the environmentally measured factors associated with each location can be updated and refined as subsequent trips to the location are undertaken. The locations themselves form a matrix of reference points for use on subsequent visits by the user or other users of the system on which the data is maintained.

In accordance with the foregoing, the present invention recognizes the availability of a plurality of environmental factors and conditions and senses a collection of such factors. The factors may relate to electromagnetic radiation, such as radio-frequency or other radiation sensible by the mobile device, and may include, but not be limited to, signal strength, security methods or characteristics detected (such as detectable network encryption), network ID information (such as the SSID of an IEEE 802.1 lb/a/g network), the number of broadcasting devices visible, interference sources as detected by lost packet traffic, frame formatting (such as a short or long preamble within an IEEE 802.11b/alg frame or base station MAC addresses as detected in a TCP/IP based network. The characteristics may be associated with transmissions within the system with which the receiver is associated, as well as by third party systems. Other sensors may also be employed to provide other environment factors and condition data. For example, optical sensors may be incorporated to detect specific lighting characteristics which may assist in determining indoor, outdoor, or specialized lighting systems (such as a pink tint that can be related to butcher shop display cases). Other environmental factors may also be sensed, such as atmospheric pressure, temperature and background noise. The collection of a variety of parameters allows development a matrix of correlation opportunities that can enhance the ability of a location determination system to generate an accurate prediction of the device (and user's) location.

The incorporation of sensors into small, portable devices, and particularly a watch as known and exemplified by Sekiguchi, U.S. Pat. No. 6,751,164 B1. Such art, however, merely provides a display capability and does not encompass the use of such sensed environmental data for location-determination purposes.

The present invention contemplates an automatic measurement of such parameters, correlated to specific locations that are of interest to users of the system, such as with known activities of the user that are characterized by delivery points or points of service. The automatic measurements can be used to update and refine correlations previously developed with respect to the location, allowing the available data associated with the location to be continuously improved and refined. The invention can take advantage of sensible infrastructure characteristics installed by unknown and unidentified third parties as well as incidentally generated radiation to develop a detailed parameter index for determining location.

The association of the measurable environmental parameters with a specific location may be made with recognition that these parameters are by themselves not necessarily fully and uniquely determinative of the location at which they are sensed, but may be only indicators of a probability measure (or score) to quantify the likelihood of being at a specific location. Depending on the nature of the device and the intended application, each factor or parameter may be assigned a different weight or relative value to facilitate establishing an overall indicator matrix of improved reliability.

The determination of a specific location may be presented or displayed to the user of the portable device, such as through a display on the device itself, may be provided to the users of the system or stored as a record of travel for the portable device and/or its user, or may be used to trigger an activity or operation dependent upon the location determined, such as opening a gate or disabling an alarm system or machine that is to be repaired by the user.

BRIEF DESCRIPTION OF DRAWINGS

A fuller understanding of the invention will be achieved upon consideration of the following detailed disclosure of a preferred, but nonetheless illustrative embodiment of the invention when reviewed in association with the annexed drawings, wherein.

DETAILED DESCRIPTION OF THE INVENTION

A preferred embodiment of the invention described herein utilizes a full spectrum of detectable physical parameters, including the electromagnetic radiation spectrum (or conversely, the lack of signals at particular wavelengths or frequencies thereof) as recognized in classical physics. The spectrum includes measurable environmental parameters of the electromagnetic spectrum as may be typified by, but not limited to, radio waves and visible and non-visible optical radiation in both specific frequency ranges and as broad-spectrum ambient light or radiation. Other environmental parameters that may be sensed include barometric pressure, temperature and background noise. While the receptors or sensors for such parameters are preferably embodied in a hand held device as described herein, the invention are not limited to such an embodiment. The invention may be embodied, for example, in devices and systems worn on the body, mounted to moving vehicles or, in alternative constructions that may be moved from time to time.

Figure 1:
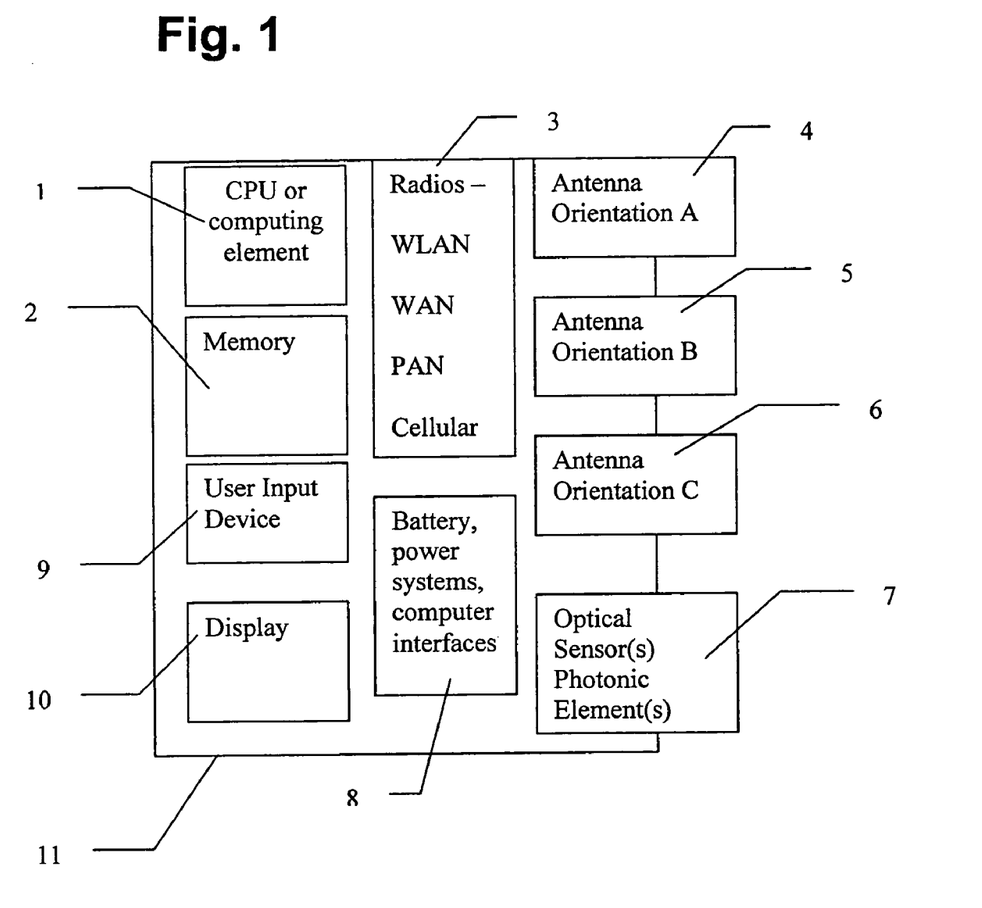
FIG. 1 is a block diagram depicting a general configuration of a hand held device of the invention having sensors.

A preferred embodiment of a hand held device 11 is illustrated in FIG. 1. The device 11 contains a computing system or device comprising a central processing unit or computing element 1 with memory 2, a user input device 9, a display 10 and a battery or other power system and appropriate computer interfaces 8. These elements of the hand held device allow local computation and decision making based upon sensed inputs, local programming software, external activation through the computer interfaces, or external controls or from communications with system elements outside the mobile device via a radio system block 3 using various antenna configurations 4,5,6. Additionally, the hand held device 11 may utilize a combination of inputs from the user through the user input device 9, as received through the radio block 3 and the antenna system 4,5,6, and/or other environmental factor data as processed by or on a board sensor block 7. User input device 11 may be used to control the programmed response and operation of the mobile hand held device. The operation of the various components and systems of the hand held device 11 are conventional in nature, and within the skill of the art.

Figure 2:
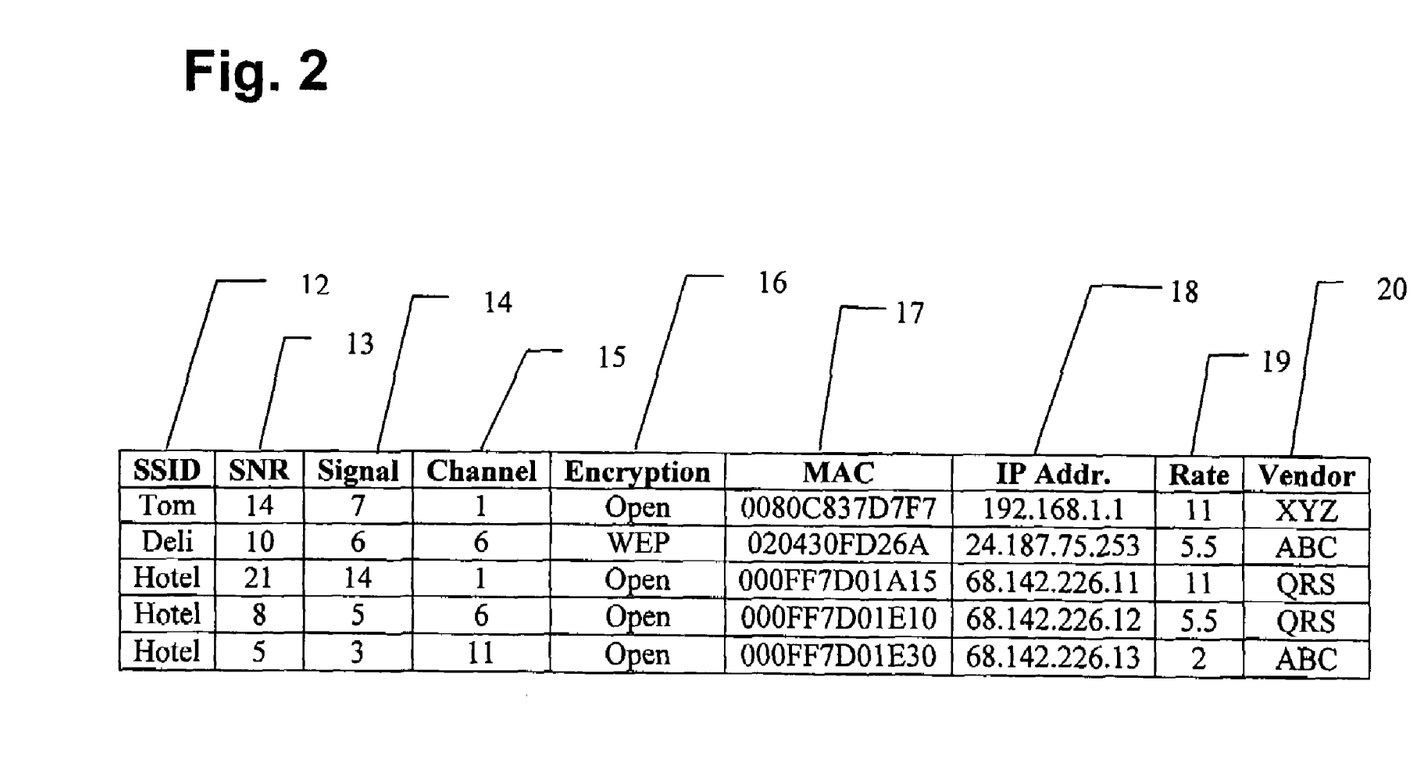
FIG. 2 is a table identifying certain general information that may be available for and by the invention from a set of wireless local area networks that can be utilized by the invention.

As the invention utilizes parameters associated with local environmental conditions as an aid to fixing the location of the hand held or other device bearing the antenna system 4, 5, 6 and the sensors 7, FIG. 2 depicts a table of generally available information broadcast by a wireless local area network (w-lan) that could be sensed through a typical radio block 3 in conjunction with software either operating as a dedicated part of the radio block or as executed by computing element 1. Radio broadcasts are captured via the antenna elements 4,5,6 and the information transmitted therein or otherwise associated with the transmission is detected by the radio block 3. The antennas may be directional, so that directional information associated with a given transmission can be ascertained. As shown, the radio blocks may have the capability of receiving a range of frequencies and may include scanning functions to access such frequencies on a continuous basis. The radio block 3 does not have to make contact or establish any form of bi-directional communication with the base stations from which the broadcasts originate to gather this information. Thus, a base station 22 need not be "associated" with the hand held device 11, or the system with which it is employed, although it may be possible to gain more information associated with a broadcast if the radio block attempts to access a base station through direct communication.

As shown in FIG. 2, w-lan base station information may include an SSID 12, which is typically used by the owner of the base station to identify the base station to users or subscribers of that system. This information is often freely transmitted in an open format, allowing receiving radio units to decode and identify the name of the base station device. Other parameters associated with the broadcast, such as characteristics of the absolute signal strength, are identified by the radio block and stored as a Signal value 14. The radio block may also be capable of assessing the relative strength of the signal to overall local radio noise in the receiver's environment 21, and stored as a signal-to-noise ratio (SNR) 13. The constellation of this information can be helpful when compared with data from previous visits to a location or compared with otherwise obtained knowledge of the base station's signal strength and known interference or noise elements 24 in identifying an unknown location.

W-lan base stations also have broadcast characteristics as defined by international standards bodies, such as the IEEE 802.11 standard. These standards are very helpful, as they further define the characteristics and behavior of a base station and can also be sensed and measured by radio block 3 and associated software. The standards developed and applied in connection with Internet communications, such as TCP/IP protocols, can provide large amounts of specific identification data, such as the SSID 12, channel 15, encryption type 16, MAC address 17, IP address 18, data rate 19 and vendor code 20. This information may all be used to help determine the location of the hand held device 11 through comparison with stored reference values for known locations.

Figure 3:
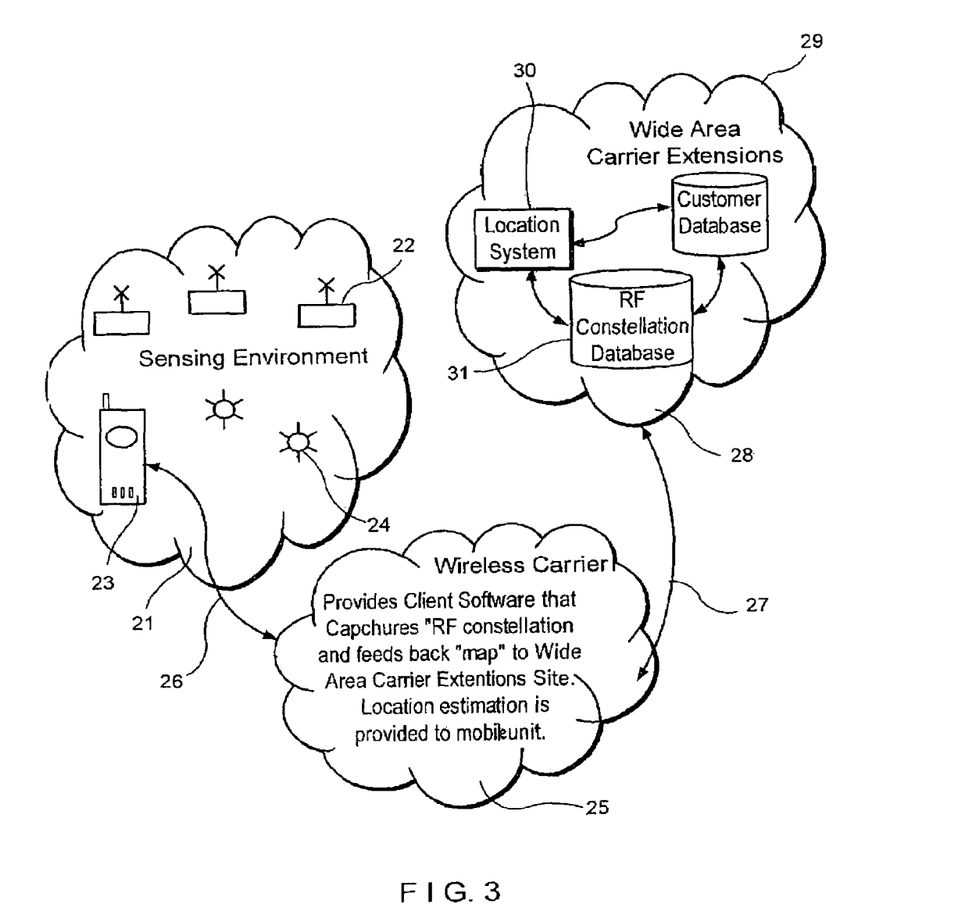
FIG. 3 is a block diagram of a preferred embodiment of a system incorporating the present invention.

With reference to FIG. 3, the totality of data elements associated with radio transmissions received and processed forms an overall RF Constellation which may be transmitted from the hand held device 23 in the Figure to a central facility 28, called a Wide Area Carrier Extension ("WACE"), either via a Wireless Carrier system 25 that serves as an interface between the hand held devices 11 and the WACE, or directly through other means. The WACE includes a RF constellation database of RF Constellations associated with the corresponding locations, as well as a Location System 30 comprising appropriate processors and ancillary devices that allows the transmitted RF Constellation information from a device 23 to be compared with stored data in the Constellation database to develop a best match of parameters to determine the location of the hand held device. The Location System 30 may employ appropriate algorithms, executed by appropriate processors as known in the art, to compute a probable match between the received data and to a location or locus of locations. A computed vector trajectory of the mobile unit, based upon changes in environmental parameters, may also be used by the Location System to estimate location through change analysis. The Location System may also use a scoring system to generate a best opportunity output for the hand held device's user to decide if it is correct based on the user's personal knowledge of the actual location. The software required to perform these tasks is of conventional nature and is known to those skilled in the art.

In addition to the RF Constellation 31 containing data specific to known electromagnetic radio sources, it may also include general electromagnetic radiation data associated with perceived environmental conditions collected by the mobile device 23. Corresponding data may also be stored in the database 28 in association with the location with which it is associated. Both the RF Constellation and the RF Constellation Database may also include collected data such as may be collected by other sensing elements 7 in the mobile device, such as audio signals, either at specified frequencies or as noise, temperature, barometric pressure, and light levels. The received constellation data can also be correlated to other reference data maintained in the Constellation Database, such as data that is readily available through public databases or directories that may be harvested from the Internet or other public sources, or to data from personal observation or measurement specifically entered into the database for correlation purposes to further enhance the correlation process.

Figure 4:
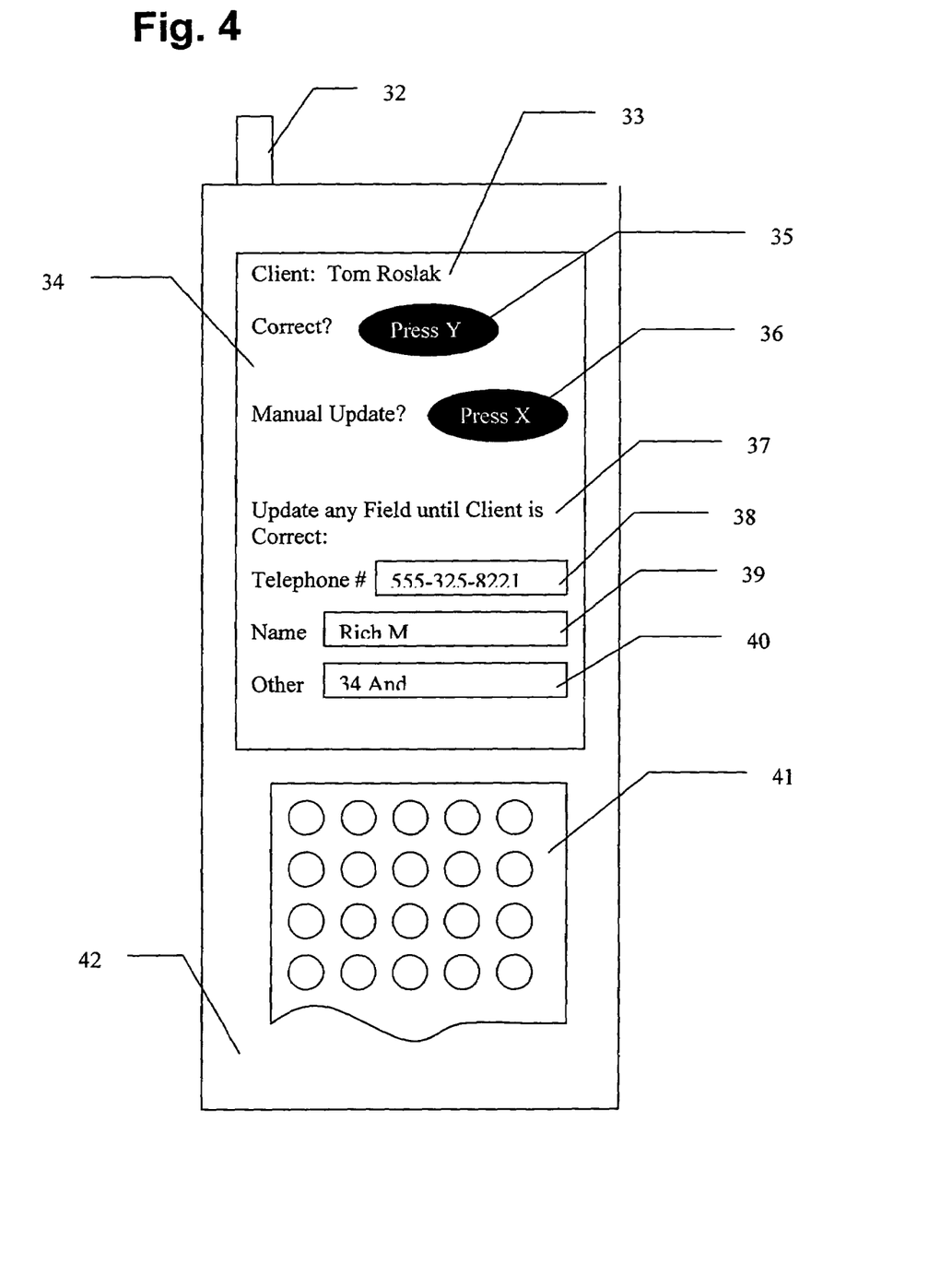
FIG. 4 is a representation of a preferred embodiment of a mobile unit user interface of the invention.

The WACE also has a customer database 29 that contains information related to known locations, which may be identified as a customer, service location or otherwise as appropriate for a particular user or users of the system, and as that are used or otherwise associated with a particular hand held device/mobile unit/client 23. This can allow a unit/client 23 to identify one or more specific target locations and limit correlation to be between the transmitted RF Constellation data from the hand held device and the client-specific target locations, or to have the WACE limit potential matches to particular customers or locations. An example of a hand-held unit particularly adapted to accommodate such a feature is illustrated in FIG. 4, depicting a hand held device 42 having a display screen and a keypad 41. A client field 33 is displayed on the screen, based upon the Location System's correlation of the data in an RF Constellation transmitted from the mobile client to the WACE and compared to the RF Constellation Database 31 and the customer database 29 and the transmission of determined client field data to the mobile unit through the Wireless Carrier 25. The user of the mobile device in this embodiment is requested by resident software to confirm the identity of the determined client/location by entering a confirmation 35, or alternately by choosing to enter data manually through the keypad 41 after activating a manual update field indicator 36. This embodiment illustrates the use of a touch screen interface 34 in conjunction with keyboard 41, which those skilled in the art will recognize represents just one illustrative implementation of the invention. The invention may use specific keys in the keypad 41, as well as voice activation, expanded data entry through the touch screen, external triggers, bar code reading or other input device to input data.

As the predictive value of the system is based on the quality and quantity of the data in the RF Constellation Database, the invention features the ability of the system to continuously gather data from the field through a hand held device and associate it with a location through ad hoc correlation. With selection of Manual Update 36 on the screen, the set of environmental conditions sensed by the hand held device will be correlated in the RF Constellation Database with new manually-inputted information, such as a client (location) name 39, address 40, and/or telephone numbers 38 instructed to be entered by message 37. The grouped data is transmitted to the RF Constellation Database and the Customer Database 29 in the WACE either for entry as a new location, or to update and refine data associated with a Known Location data repository, as well as to evaluate possible corrections to the location algorithms of the Location System 30.

Formed data sets may also be stored locally on the hand held device 11 in local memory 2 for upload when the hand held device is within range of a serviceable network connection 26, allowing for connectivity through the Wireless Carrier system 25 back to the WACE 28. The connection between the Wireless Carriers 25 and the WACE itself may be through one or more wired and/or wireless connections 27. Use of the Wireless Carrier system also allows mobile units 23 to collect data and make local correlations including data derived from receptions from a Wireless Carrier station, which may be, for example, a cellular tower serving as a fixed station wireless transmitter for the system. Because the location of a fixed Wireless Carrier of the system is known, position determination may be capable of being performed by software in the mobile device without the necessity of being in direct or indirect contact with the WACE and the algorithms of Location System 30 external to the mobile device. It is also within the contemplation of the invention that a subset of the Location System 30, RF Constellation Database 31 and the Customer Database 29 may be maintained locally on the mobile unit 23 to perform correlations and to present data directly to the user without contact with the WACE.

To further enhance the prediction nature of the invention, Location System 30 may seek environmental data from outside sources, such as a real time weather bureau, to correlate received data related to such corresponding RF Constellation environmental parameters. For example, sensed barometric pressure, when compared to an appropriate reference value, could be used to estimate the actual altitude of the mobile unit to better determine location. Such adjustment could also improve the accuracy of a pre-loaded prediction for the data that would be used by the user of the mobile device.

Other environmental inputs forming part of the RF Constellation may also include the type of noise and signals that surround and thus are perceived by sensors of the mobile device. For example, it may be possible to tell the difference between a location that is indoors and outdoors by correlating detected radio signals in conjunction with ambient acoustic and/or electromagnetic noise and temperature. A high confidence of estimating the probability that a user is indoors in urban environments in winter may be achieved by detecting increased temperature, lower ambient acoustic noise as detected by a microphone sensor in the device, and radio signals. By accepting a wide range of input parameters the invention is adaptable to a variety of configurations and packaging, including hand held, as well as being physically worn by a person, installed in a package, or attached to a vehicle or other moving object. The invention can be self-contained, utilizing its own sensors, or may be configured to or receive information and support from its host.

Figure 5:
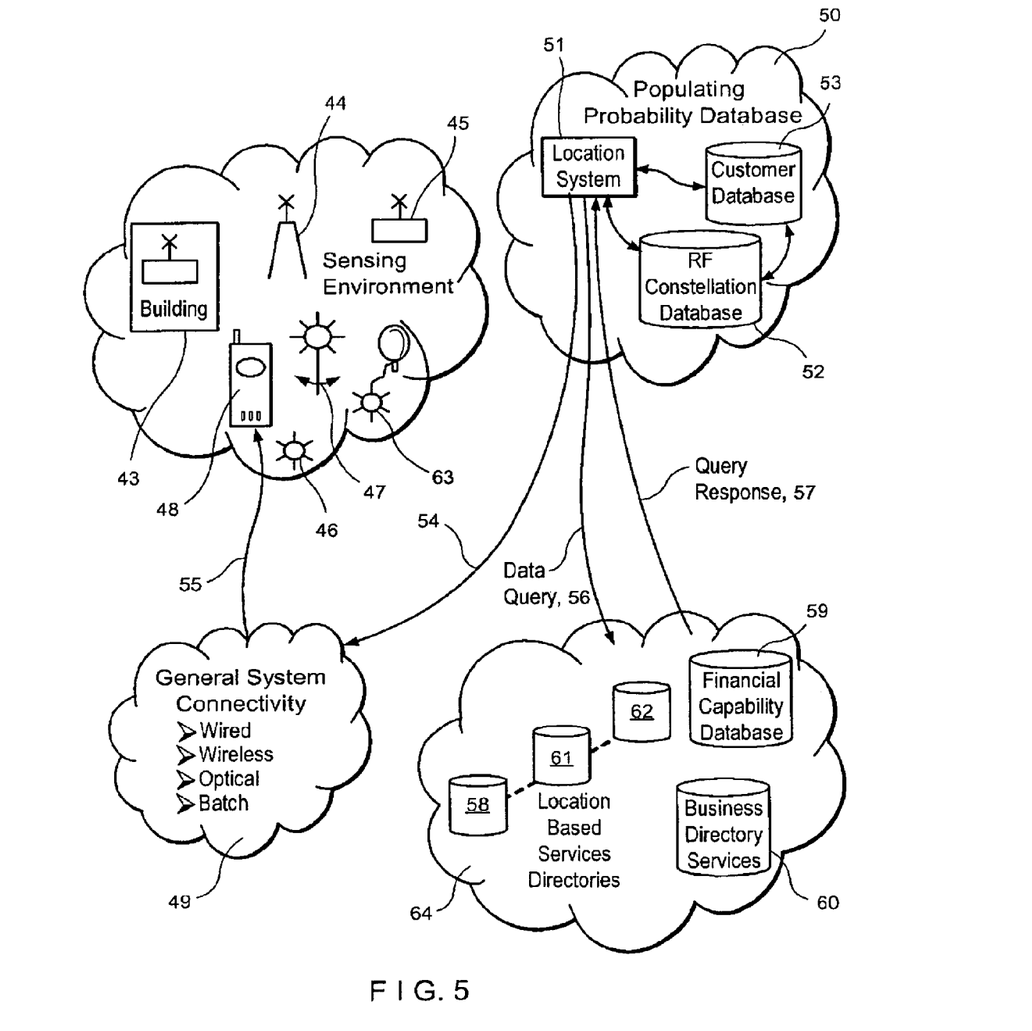
FIG. 5 is a flow diagram depicting the system during a parameter assessment phase.

The invention has value in a wide range of applications. FIG. 5 provides an overall illustration of a comprehensive system in accordance with the invention. For example, it may be possible to use the invention without user intervention for the purpose of tracking vehicles on a predetermined route, in place of or to augment more expensive GPS positioning. As a supplement to GPS, the combination of the invention with GPS tracking data can provide the capability to correlate RF Constellation data to a known location of the mobile unit 48 as determined by GPS in real time. This data is then input into the RF Constellation database 52 for association with an enterprise-based customer (location) in Customer Database 53 for current use and later retrieval by users of the system without GPS reliance. Further, it may be possible to automatically input environmental data, correlated or associated directly to known businesses or landmarks, which are also graded or scored for relative persistence.

The environmental data collected can also be used to control the operation of the portable receiver or an apparatus or device coupled thereto. For example, an audio or video recorder can be activated when analysis and correlation of the received RF Constellation indicates that the receiver is at a location where activities are occurring that are to be monitored. Alternatively, a specific message may be broadcast to the receiver or otherwise made accessible to the user or receiver, such as a password or access code for a particular piece of equipment, that should only be made available to the user when the user's arrival at the location where the equipment is located is confirmed. In a similar vein, an unlock or access code can be sent directly to a piece of equipment, allowing the user access to the equipment for a particular length of time when the user's arrival at the location is confirmed. A disable signal can also be generated to turn off an alarm or power down a piece of equipment. Location confirmation may also trigger the printing of information germane to the user's needs, such as a work order or blueprint, on a local or otherwise coupled printer, without the user making a specific request therefor. Information concerning the data and materials to be made available can be stored either in the receiver or remotely to generate the needed signals upon user arrival without further intervention or requests.

Once an RF Constellation for a given location/enterprise is entered into the database, its reliability for subsequent reference can be enhanced by further analysis of available data associated with the data source. Factors related to business ratings and predicted characteristics of a business, enterprise, or data source can be factored into persistence values for the RF Constellation database elements associated with the business or device type transmitting the information. A statistical prediction factor is created relative to the data source's persistence or expected longevity, which then can be used as a further weighting function when the constellation data is recalled for use at a later date. The prediction factor may be based, for example, upon the host business's financial resources, the type of transmitter or source for the data, predicted use and/or life of the transmitting device, difficulty in moving the transmitting device, and other factors as may be iteratively collected over time, either by the sensors of the invention or otherwise.

The quality of RF Constellation database data will improve with repeated usage and updating and can be augmented by the addition of other parametric information related to the data sources and by data developed through correlation with other sources of data. For example, initial data from the receiving device 48 can be transmitted through link 55 through any of a variety of intermediate connectivity systems 49, finally arriving through one or more access links 54 at the Location System 51. The Location System will do a rapid query of the RF Constellation database 52 and the customer database 53 to produce rapid business application data for use by the detecting device 48. Additionally, the Location System 51 may request or do a data query 56 to external sources 64 which contain data, whether specific or generic, associated with identifiable information about the sources of the data received by the unit 48 and passed to the Location System, such as building 43 or 45 or transmitter tower 44. Many commercial entities encourage users to access their communications channels and make readily available transmitted information that is not encrypted and available to the general public. Such data identifying the ownership of the device can then be used to develop further information related to the type of transmission device and the relative persistence of its location. Persistence of the source and the stability of its location may be calculated with consideration of the type of business, the type of technology employed for the transmission, as well as the relative stability of the business organization itself and the capital equipment employed, as such data is available.

The Location System 51 may also query external databases, such as external financial databases 59, to establish the financial stability of the owning entity of the data source. Data from these financial databases may be used to further develop a relative persistence of the deployed broadcast data asset, typically an RF transmission. Additionally, assessed financial data may be correlated with external business directory services databases 60 that may identify specific business locations related to the business. Exemplary of such locations which may be able to be related to a specifically advertised service includes businesses that offer wireless connectivity to users in the area. The weight applied by the Location System's algorithms to such data may be adjusted, for example, by consideration of the perceived stability of the business as developed by use of the financial databases 59 and/or the relative mobility of the RF devices related to the known technological characteristics of the transmitters.

Transmitters that are physically tied to a building location, such as 43, may have an initially relatively high persistence rating, which can be further adjusted in relation to the nature of the business employing them. High persistence businesses that have such transmitters may include lodging establishments and businesses that invest in owned properties as opposed to short-term leases. Information for determining the nature of the business may be established by data derived from the financial databases 59. Transmitters that are tied to heavy infrastructure, such as a cellular tower 44, likely have a high persistence, as opposed to unknown devices that may be sensed from time to time by the detecting device 48. These transient devices can be catalogued as such by the Location System 51 and stored in the enterprise RF Constellation database 52 and customer database 53 for immediate recall by the detecting device 48, or may be downloaded periodically into the detecting device 48 for rapid application without the need to query the location system for high persistence transmitters. This saves communications bandwidth, power and decreases overall system response times by avoiding the need for establishing communication between the mobile device and the Location System.

Other data source transmitters may be identified from time to time as relatively "floating" within the sensed RF constellation at a given location and may be characterized as "dynamic" by a low probability of persistence due to a general inability of further classification. Such floating transmitters 63 may only be in a given area for a time and are not tied to specific physical infrastructure by the system. Such sources may be very useful for correlation purposes over the short term but are less deterministic for overall and continued location detection. An example of such a floating transmission source 63 would be RF infrastructure installed for a specific trade show at a major conference. Such a network, while robust and easily detected during operation, might only exist for a relatively short and finite period, never to be seen again. Such a transmitter could be further qualified, however, by a query to additional databases 61 available to the Location System which could provide details related to the nature of the transmitter, the venue or the event related to sighting the transmitter, allowing an appropriate persistence rating (albeit short) and weighting to be generated, thus adding overall weight to the source's value.

Persistence parameters may consider factors related to the business operations of an organization that owns the transmitting devices. External database queries may be performed off-line once the detecting device 48 reports the appearance of the transmitter through its RF constellation as viewed by the device. Factors that may be considered for business owned transmitters may relate to the preference of the business entity for fixed assets, its history of past movements of operations, typical incremental costs for moving the type of business, and other economic or business parameters that could relate to location persistence. A highly capitalized equipment-based business with high financial stability, such as a car manufacturer, for example, may have a very high persistence probability, whereas a small service agency, such as a newly-incorporated insurance broker, may well have a relatively low location persistence rating. While both transmitters may be highly detectable and, at any given moment, be highly reliable, over time the relative persistence will be radically different. Thus stability parameters may be very important to the continued accurate correlation and location estimation with any degree of certainty. The Location System 51, applying appropriate statistical and probabilistic methodology, can take into account calculated or estimated variations in persistence to increase the correlation probability of the RF Constellation, placing less emphasis on lower persistence transmitters and a heavier emphasis on transmitters associated with higher persistence ratings.

Additional location information may be derived from the path of a query request 55 and the routing path of an associated transmission through the connectivity system 49 and the access links 54 utilized to reach the Location System 51. In one embodiment, the data path from the detecting device 48 to and from the Location System can be traced and stored. This route trace can provide at least a gross representation of where the device resides, further adding to other parameters in a received RF constellation for correlation. At the least, such data can provide a limiting function for the scope of potential correlations. The endpoints of the route may be identifiable through databases 62 of service providers as listed on the Internet or in other public or proprietary databases 58, 60, 61, and can further qualify the correlation of detected transmitters to the RF constellation database.

Figure 6:
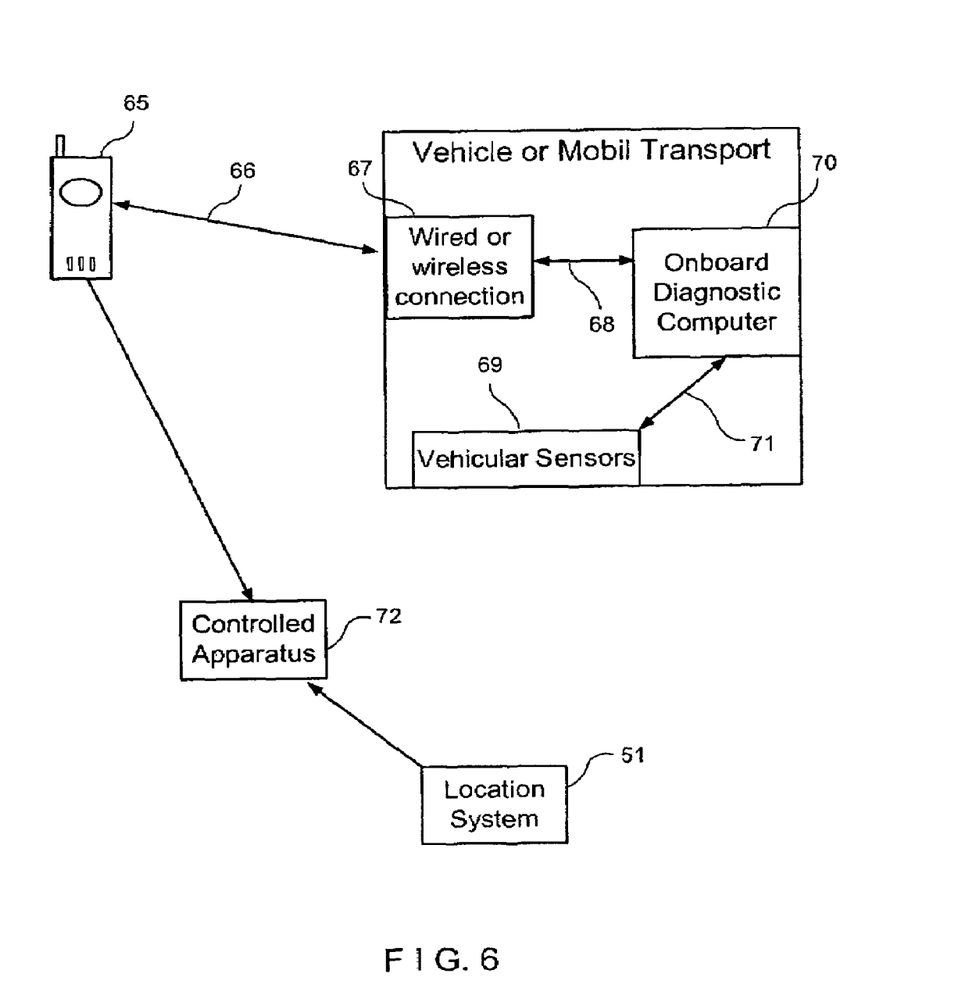
FIG. 6 is a flow diagram depicting a location based estimation phase.

As depicted in FIG. 6, in one embodiment of the invention the mobile device 65, in a car, truck or similar vehicle, communicates with a vehicular or mobile transport onboard diagnostic computer system 70 via a wired or wireless communication link 66 to obtain environmental and performance data as collected by vehicular sensors 69 associated with the diagnostic computer system. The data obtained from the vehicular sensors are used by the invention to provide additional information that is added to the RF Constellation database, based on a known position of the vehicle.

The figure also illustrates how environmental data collected can also be used to control the operation of the portable receiver or an apparatus or device 72 coupled thereto. For example, the coupled device 72 may be an audio or video recorder, to be activated when analysis and correlation of the received RF Constellation indicates that the receiver is at a location where activities are occurring that are to be monitored. Alternatively, a specific message may be broadcast to the receiver or otherwise made accessible to the user or receiver, such as a password or access code for a particular piece of equipment, that should only be made available to the user when the user's arrival at the location where the equipment is located is confirmed. In a similar vein, an unlock or access code can be sent directly to a controlled apparatus or equipment, allowing the user access to the equipment for a particular length of time when the user's arrival at the location is confirmed. Location confirmation may also trigger the printing of information germane to the user's needs, such as a work order or blueprint, in which case the controlled apparatus 72 may be a local or otherwise coupled printer, without the user making a specific request therefor. Information concerning the data and materials to be made available can be stored either in the receiver or remotely to generate the needed signals upon user arrival without further intervention or requests. The controlled apparatus may be hard-wired to the receiver, be enabled through a network connection, or be controlled by a wireless signal. Network or wireless connections can allow the control signals to be generated either by the mobile device 65 or the location system 51.

In a further preferred embodiment no user input is required, the communication link 66 automatically maintaining contact between the diagnostic computer system 70 and the mobile device 65 and handling the interchange of data therebetween. Power for the mobile unit can also be directly supplied by the vehicle's power system, negating the need to have a self-contained power system for the mobile unit. Vehicle-derived data may be used to estimate mileage or distance traversed by the mobile unit as logged by the vehicle itself. Such information provides a non-directional distance that may be integrated with a statistically expected route, and can be added to the RF Constellation database to increase the accuracy of location placement along traveled routes.

Information obtained from the onboard vehicle diagnostic computer system can also be made available to the mobile unit to establish, correlate and apply weight values to other signals being received. For example, vehicle speed, travel direction, and engine performance data may serve as a weighting function for a radio signal who's reception is subject to the direction in which the vehicle is traveling or the degree of engine noise or interference generated. Traffic conditions experienced may also be sensed through consideration of average and instantaneous speed, braking and the like, and can be associated, for example with road work or construction at a given location, along with an appropriate persistence factor.

Connectivity between an input/display unit and a WACE may also be by means other than wireless. For example, wired communications may be practical, such as when a device operates autonomously and requires contact with stored databases and a remote Location System only to upload and download information on a batch, as opposed to real time, basis. Additionally, communications between mobile units, intermediate connectivity elements and a WACE, may take place via optical interfaces, capacitive coupling, magnetic coupling and other means, as known in the art. The present invention does not require any specific type of interface between elements.

I claim:

1. An apparatus for controlling an operation based upon a determined location of a user, comprising:
   a receiver associated with the user for sensing and measuring a plurality of physical parameters present at the location of the receiver;
   an input arrangement for receiving reference data sets of physical parameters corresponding to known locations;
   a database for storing the known locations with the corresponding reference data sets of physical parameters;
   means for correlating the measured physical parameters with the reference data sets to identify at least one best match therebetween; and
   means for controlling the operation based upon the identity of the at least one best match, wherein at least one of the measured physical parameters and at least one of the reference data sets include a non-radio physical parameter.

2. The apparatus of claim 1, wherein the means for controlling an operation is located at the location of the receiver.

3. The apparatus of claim 1, wherein the means for controlling an operation controls an operation at the location of the receiver.

4. The apparatus of claim 1, wherein the means for controlling an operation controls an operation at a location defined by at least one of the at least one best matches.

5. The apparatus of claim 1, wherein the means for controlling an operation includes a wireless link to a location where the operation is performed.

6. An apparatus for determining a location of a user, comprising:
   a receiver associated with the user for sensing and measuring a plurality of physical parameters present at the location of the receiver;
   an input arrangement for receiving reference data sets of physical parameters corresponding to known locations;
   a database for storing the known locations with the corresponding reference data sets of physical parameters;
   means for correlating the measured physical parameters with the reference data sets to identify at least one best match therebetween; and
   a display for presenting to the user the known locations associated with the at least one best match as a prediction of the location of the receiver and hence the user, wherein at least one of the measured physical parameters and at least one of the reference data sets include a non-radio physical parameter.

7. The apparatus of claim 6, wherein the receiver is portable.

8. The apparatus of claim 7, wherein at least one of the database and the correlating means are at a location remote from the receiver.

9. The apparatus of claim 8 further comprising a communications link between the receiver and at least one of the database and correlation means at the remote location.

10. The apparatus of claim 9, wherein the communications link is a wireless link.

11. The apparatus of claim 1 or 6, wherein the physical parameters are chosen from electromagnetic radiation, temperature, pressure and audio parameters.

12. The apparatus of claim 11, wherein the electromagnetic radiation parameters include parameters in the radio and visible light spectrums.

13. The apparatus of claim 11, wherein the correlating means includes means for computing and applying persistence weighing factors to the physical parameters.

14. The apparatus of claim 13 further comprising means for querying at least one third-party database for data in connection with the computation of a persistence factor.

15. The apparatus of claim 14 wherein a third-party database is a financial database.

16. The apparatus of claim 1 or 6, wherein the receiver is associated with a vehicle having a source of data relating to operating parameters of the vehicle, the receiver having means for receiving and processing the data as physical parameters.

17. A method of determining a predicted location of a user, comprising the steps of:
   receiving a reference value of a physical parameter associated with a known location;
   obtaining a value for different types of selected physical parameters at a user's location; and
   comparing and correlating, at the user's location, the value of the selected physical parameter to the corresponding reference value to determine a location associated with a best fit between the value of the selected physical parameter and the reference value, wherein the selected physical parameter and the reference value include a non-radio physical parameter.

18. The method of claim 17 further comprising the step of controlling an operation based upon the identity of the best-fit location.

19. The method of claim 17 further comprising the step of displaying the identity of the best-fit location to the user.

20. The method of claim 17 further comprising the step of applying persistence weight factors to the reference values as part of the correlating step.

21. The method of claim 17 further comprising the step of updating the reference values for the best fit locating with reliance upon the obtained values.

* * * * *